2,984,692
PRODUCTION OF METHYLINDANE

Henry F. Lederle, Stamford, Conn., assignor to Sinclair Refining Company, New York, N.Y., a corporation of Maine No Drawing. Filed Oct. 30, 1957, Ser. No. 693,240

3 Claims. (Cl. 260—668)

The present invention relates to a process for making methylindanes by the dehydrogenation of tetrahydrodicyclopentadiene. In a particular aspect, this invention concerns a two-stage hydrogenation-dehydrogenation process for the production of methylindanes from dicyclopentadiene.

Methylindane is an intermediate in the preparation of methylindene, a compound useful in the production of polymers and resins. It has now been discovered that methylindanes may be economically produced from dicyclopentadiene, a reasonably cheap and available raw material.

The present invention may be briefly described as a method for producing methylindanes which comprises the dehydrogenation of tetrahydrodicyclopentadiene. This tetrahydro material can be readily and inexpensively obtained by hydrogenating dicyclopentadiene at a temperature below about 40° C., preferably below about 25° C. The methylindanes are separated from the reaction product of the dehydrogenation or the reaction product can be further treated to obtain other products from the methylindanes.

In accordance with my invention hydrogenation of the dicyclopentadiene can be carried out by any of the hydrogenating procedures and hydrogenation conditions in the art with or without a hydrogenation catalyst. Suitable catalysts for purposes of this invention are any of the hydrogenation catalysts such as those containing a group VIII metal, e.g. nickel, a platinum group metal, etc., and the promoting metal may be supported on a solid carrier such as activated alumina, silica, etc. In the latter case the promoting metal is usually the minor portion of the catalyst. Preferably the hydrogenation step of the present invention is carried out in a low pressure hydrogenation apparatus at room temperature (i.e. about 20° C.) and in the presence of a Raney nickel hydrogenation catalyst. It is advantageous to conduct the hydrogenation at no higher than slightly above room temperature for the employment of higher temperatures cracks the dicyclopentadiene into two moles of cyclopentadiene. Prior to hydrogen treatment a suitable solvent such as ethanol is generally employed to dissolve the dicyclopentadiene, normally crystalline at room temperature.

The hydrogenation mixture resulting from the above hydrogenation contains as the main product tetrahydrodicyclopentadiene which upon dehydrogenation produces the desired methylindanes. Although the entire hydrogenation mixture can be subjected to dehydrogenation in accordance with the second stage of the present invention, it is preferred, for maximum yields, to separate the tetrahydrodicyclopentadiene from the hydrogenation mixture and subject it to dehydrogenation. Such procedure is preferred because the hydrogenation mixture of the present invention may contain, in addition to tetrahydrodicyclopentadiene, small amounts of undesirable catalyst, unreacted dicyclopentadiene, and other reaction products detrimental to the attainment of maximum yields. Separation of the tetrahydrodicyclopentadiene can be readily carried out by recrystallization.

The dehydrogenation stage of the present invention can be conducted under dehydrogenation conditions and any of the dehydrogenation catalysts can be employed. Examples of dehydrogenation catalysts that can be employed are chromium oxide, tungsten oxide, vanadium oxide, titanium oxide, iron oxide, platinum, nickel, and molybdenum oxide. The oxides can be supported on solid carriers such as activated alumina, silica, etc. It is preferred in the dehydrogenation to employ a platinum group metal alumina containing about 0.1 to 2.0 percent of platinum metal supported on an activated alumina. The preferred dehydrogenation conditions of this invention are as follows:

Temperature _____ 370–550° C.
Space Velocity (weight of feed per weight of catalyst per hour—WHSV_ 1–10.
Pressure _____ 50–500 p.s.i.g.
Hydrogen/hydrocarbon mole ratio _____ 5–15 (inlet).

Suitable solvents such as benzene are generally employed to put the tetrahydrodicyclopentadiene into solution prior to the dehydrogenation.

The invention is further illustrated by the following example which is not to be considered limiting.

A low pressure hydrogenation vessel was charged with 251 g. of dicyclopentadiene (1.9 moles) and 250 ml. of absolute ethanol. A small amount of Raney nickel catalyst was added, the hydrogen cut in and the shaking started. At the end of three hours, 1.9 moles of hydrogen had been absorbed. Thirty additional hours were required at this rate to complete the addition of hydrogen.

A composite of the crude hydrogenation mixtures from two of these hydrogenations was warmed, the catalyst removed by filtration through a Buchner funnel. The alcoholic solution was concentrated and the tetrahydrodicyclopentadiene allowed to crystallize. The waxy white crystals were collected and dried by drawing air through the cake. The cake was distilled through a short packed column to remove any alcohol present. The tetrahydrodicyclopentadiene distilled at 190 to 192° C. and it had a setting point of 74° C., and had an iodine number of 10.3. Infrared data indicated the hydrogenation was quantitative.

A 50 percent solution of the tetrahydrodicyclopentadiene in benzene was passed over a platinum activated alumina catalyst containing 0.6 percent by weight of platinum in a flow reactor. The activated alumina was prepared by calcining an alumina hydrate containing about 65 to 95 percent of alumina trihydrate with the remainder of the hydrate being amorphous hydrous alumina or alumina monohydrate. The following conditions were used:

Temperature _____ 460–475° C.
Pressure _____ 200 p.s.i.g.
WHSV _____ 2.6
Hydrogen/hydrocarbon ratio _____ 14/1.

The liquid reaction product was removed from the flow reactor and fractionally distilled.

Making allowance for the 50 percent benzene dilution, and the liquid recovery of 92.2 percent, the product contained about 24 percent of methylindanes with an appreciable amount of 4-methylindane being present.

The 4-methylindane produced by the process of my invention can be readily converted to 4-methylindene by dehydrogenation using conditions similar to those known for dehydrogenating ethylbenzene to styrene. If indane itself should become more desirable than methylindane, a hydrocracking operation might be employed. This would simply involve subjecting methylindane to conventional hydrocracking conditions in the presence of a hydrocracking catalyst.

I claim:
1. A process for producing methylindane which comprises dehydrogenating tetrahydrodicyclopentadiene in the presence of a dehydrogenation catalyst at a temperature of about 370 to 550° C. to produce methylindane.
2. The method of claim 1 in which the dehydrogenation catalyst contains platinum as an active component.
3. The method of claim 1 in which the dehydrogenation catalyst is platinum-activated alumina.

References Cited in the file of this patent
UNITED STATES PATENTS

| | | |
|---|---|---|
| 2,560,329 | Brandon | July 10, 1951 |
| 2,752,403 | Schutze et al. | June 26, 1956 |
| 2,766,301 | Buchner et al. | Oct. 9, 1956 |

OTHER REFERENCES

Faraday: Encyclopedia of Hydrocarbon Compounds, volume $C_{10}H_{16}$ (6a), 1948 (page 10165.00.11).

Wilson: The Chemistry and Utilization of Cyclopentadiene, reprinted from Chemical Reviews, February 1944 (page 42 only).